United States Patent
Wardzinska et al.

[11] Patent Number: 5,907,028
[45] Date of Patent: May 25, 1999

[54] METHOD FOR MAKING POLYESTERIMIDE VARNISHES

[75] Inventors: Elżbieta Wardzinska, Grodzisk Mazowiecki; Piotr Penczek, Warsaw; Jadwiga Stanecka, Piastów; Barbara Łoś-Kuchta, Wrocław; Edward Płatek, Wrocław; Krystyna Wiaduch, Wrocław; Wojciech Jewłoszewicz, Malczyce; Tomasz Jarmulski, Warsaw, all of Poland

[73] Assignee: Instytut Chemii Przemyslowej im. Prof. Ignacego Moscickiego ul., Warsaw, Poland

[21] Appl. No.: 08/987,443

[22] Filed: Dec. 9, 1997

[51] Int. Cl.$^6$ ............................. C08G 73/10; C08G 73/16
[52] U.S. Cl. ................... 528/312; 528/310; 528/322; 528/332; 528/335; 528/336; 528/351; 528/353
[58] Field of Search ...................... 528/322, 353, 528/332, 310, 335, 336, 351, 312

[56] References Cited

U.S. PATENT DOCUMENTS 3,435,002  3/1969  Holub ........................................ 528/353
3,917,892  11/1975  Kawaguchi et al. .................... 428/383

*Primary Examiner*—P. Hampton-Hightower
*Attorney, Agent, or Firm*—Bauer & Schaffer, LLP

[57] ABSTRACT

A method for making polyesterimide varnishes by polycondensing and imidating a mixture of trimellitic anhydride, 4,4'-diamino-diphenyl methane, glycol, dimethyl terephthalate and glycerol or tris(hydroxyethyl) isocyanurate or optionally p,p'-dihydroxy-diphenyl-dimethyl methane, with a transesterification catalyst added, and subsequently dissolving the resulting polyesterimide resin in an organic solvent with a crosslinking catalyst added, characterized by the feature that 2-methyl-1,3-propanediol and/or 2-butyl-2-ethyl-1,3-propanediol is used as the glycol or as one of the glycols.

3 Claims, No Drawings

METHOD FOR MAKING POLYESTERIMIDE VARNISHES

The object of the present invention is a method for making polyesterimide varnishes, comprising polycondensation and imidation of a mixture of bifunctional and trifunctional monomers and subsequent dissolution of the resulting polyesterimide resin in an organic solvent. The polyesterimide varnishes according to the present invention can be used to enamel magnet wires to be applied in electric motors and other electric equipment.

Prior-art polyesterimide varnishes have been prepared by dissolving polyesterimide resins in organic solvents including tricresol containing aromatic hydrocarbons as additives, N-methylpyrrolidinone or a mixture of solvents contaning cyclohexanone. Polyesterimide resins are prepared by well-known methods involving polycondensation and imidation of a mixture of trimellitic anhydride, 4,4'-diamino-diphenyl methane, glycol, a trihydric alcohol, and dimethyl terephthalate or optionally p,p'-dihydroxy-diphenyl-dimethyl methane (bisphenol A) (cf. U.S. Pat. Nos. 2,421,024 and 3,435,002 and Polish Pat. 125 456 and 164 804). Ethylene glycol is generally used as the glycol. Glycerol or tris(2-hydroxyethyl) isocyanurate is used as the trihydric alcohol.

The polyesterimide varnishes prepared by prior-art methods contain at most 35% of dry matter. If the dry matter content is raised, the varnish becomes too viscous to be applied to a magnet wire, especially a large-diameter wire, so as to furnish a coating that is suitably smooth.

The purpose of the present invention is to develop a method for preparing polyesterimide varnishes with an increased dry matter content and at the same time modest viscosity that would enable the varnish to be applied onto a magnet wire so as to produce a smooth coating.

Surprisingly, it has been found that the desired effect can be achieved by polycondensing and imidating a mixture of trimellitic anhydride, 4,4'-diamino-diphenyl methane, dimethyl terephthalate, glycol, trihydric alcohol and optionally p,p'-dihydroxy-diphenyl-dimethyl methane with a transesterification catalyst added and subsequently dissolving the resulting polyesterimide resin in an organic solvent with a crosslinking catalyst added, provided 2-methyl-1,3-propanediol and/or 2-butyl-2-ethyl-1,3-propanediol is used as the glycol or as one of the glycols.

Additionally, in the method according to the present invention, ethylene glycol and/or neopentyl glycol may be used, whereby 0.05–0.50 mol 2-methyl-1,3-propanediol and/or 2-butyl-2-ethyl-1,3-propanediol is used per 1 mol ethylene glycol and/or neopentyl glycol.

As the trihydric alcohol, tris(2-hydroxyethyl) isocyanurate or glycerol is used. Zinc acetate, zinc acetylacetate or dibutyl tin oxide is used preferably as the transesterification catalyst. As the crosslinking catalyst, a compound selected from the group of esters and polyesters of orthotitanic acid is used, e.g., tetrabutoxy titanium.

As the solvent for the polyesterimide resin, tricresol is used, containing aromatic hydrocarbons as an additive, or N-methylpyrrolidinone, or a mixture of solvents containing cyclohexanone.

The method according to the present invention enables the dry matter content in the varnish to be increased, with the coating produced by applying the varnish to a large-diameter copper wire displaying the desired smoothness. This effect may be attributed to the asymmetric structure of the glycols used in the method according to the present invention, viz., 2-methyl-1,3-propanediol and 2-butyl-2-ethyl-1,3-propanediol.

EXAMPLE I

Trimellitic anhydride, 225 g, 4,4'-diamino-diphenyl methane, 115 g, 2-methyl-1,3-propanediol, 10 g, tris(2-hydroxyethyl) isocyanurate, 190 g, dimethyl terephthalate, 140 g, p,p'-dihydroxy-diphenyl-dimethyl methane, 200 g, and zinc acetylacetonate, 1.5 g, were added to a reactor, 1 dm$^3$ in capacity. The temperature of the reaction mixture was raised progressively to 210° C. and water and methanol were distilled off. The resulting polyesterimide resin, 560 g, was dissolved in a mixture composed of 50 g cyclohexanol, 300 g cyclohexanone, 200 g propylene carbonate, 200 g benzyl alcohol and 14 g poly(butyl titanate).

The resulting solution containing 42% of dry matter was used to coat a copper wire, 1.8 mm in diameter. Upon baking, a class 180 copper wire was obtained with the coating characterized by a considerable smoothness.

EXAMPLE II

Trimellitic anhydride, 160 g, 4,4'-diamino-diphenyl methane, 82.5 g, dimethyl terephthalate, 160 g, 2-butyl-2-ethyl-1,3-propanediol, 40 g, ethylene glycol, 22 g, tris(2-hydroxyethyl) isocyanurate, 130 g, and zinc acetate, 0.8 g, were added to a 1-dm$^3$ reactor. Temperature was progressively increased up to 225° C. and water and methanol were distilled off. The resulting polyesterimide resin, 450 g, was dissolved in a mixture composed of 200 g tricresol, 150 g cyclohexanone, 70 g solvent naphtha, 30 g propylene glycol, 200 g propylene carbonate, and 10 g cresyl orthotitanate.

The resulting solution containing 41% of dry matter was used to enamel a copper wire, 1.2 mm in diameter. Upon baking, a class 180 copper wire was obtained with a very smooth coating.

EXAMPLE III

Trimellitic anhydride, 200 g, 4,4'-diamino-diphenyl methane, 100 g, ethylene glycol, 40 g, 2-methyl-1,3-propanediol, 25 g, tris (2-hydroxyethyl) isocyanurate, 150 g, glycerol, 30 g, dimethyl terephthalate, 100 g, p,p'-dihydroxy-diphenyl-dimethyl methane, 50 g, and zinc acetate, 1 g, were added to 1-dm$^3$ reactor. Temperature was progressively increased up to 235° C. and water and methanol were distilled off. The resulting resin, 550 g, was dissolved in a mixture composed of 600 g tricresol and 200 g solvent naphtha containing 30 g tetra(isopropoxy) titanate and 20 g phenol resin.

The resulting solution, dry mattter content 40%, was used to coat a copper wire, 1.5 mm in diameter. Upon baking, a class 155 copper wire was obtained that had a very smooth coating.

EXAMPLE IV

Trimellitic anhydride, 200 g, 4,4'-diamino-diphenyl methane, 100 g, neopentyl glycol, 100 g, 2-butyl-2-ethyl-1,3-propanediol, 80 g, tris(2-hydroxyethyl) isocyanurate, 130 g, dimethyl terephthalate, 100 g, and dibutyl tin oxide, 0.6 g, were added to a 1-dm$^3$ reactor. Temperature was progressively raised up to 220° C. and water and methanol were distilled off. The resulting resin, 600 g, was dissolved in a mixture composed of 600 g tricresol, 200 g solvent naphtha and 25 g tetra(butoxy) titanium.

The resulting solution, dry matter content 42%, was used to enamel a copper wire, 1.8 mm in diameter. Subsequent baking allowed to obtain the copper wire, class 200, with a very smooth coating.

EXAMPLE V

Trimellitic anhydride, 150 g, 4,4'-diamino-diphenyl methane, 78 g, ethylene glycol, 60 g, neopentyl glycol, 50 g, 2-methyl-1,3-propanediol, 20 g, 2-butyl-2-ethyl-1,3-propanediol, 80 g, dimethyl terephthalate, 80 g, tris(2-hydroxyethyl) isocyanurate, 120 g, p,p'-dihydroxy-diphenyl-dimethyl methane, 100 g, and zinc acetate, 1 g, were added to a 1 -dm$^3$ reactor. Temperature was progressively raised up to 230° C. and water and methanol were distilled off. The resulting polyesterimide resin, 700 g, was dissolved in a mixture composed of 800 g tricresol, 200 g Solvesso- 100, 30 g tetra(isopropoxy) titanium, and 40 g phenol resin.

The resulting solution, dry matter content 40%, was used to enamel a copper wire, 1.8 mm in diameter. Subsequent baking allowed to obtain the copper wire, class 180, with a very smooth coating.

We claim:

1. A method for making polyesterimide varnishes for enameling electric wiring comprising:

polycondensing and imidating a mixture of trimellitic anhydride, 4,4'-diamino-diphenyl methane, dimethyl terephthalate, trihydric alcohol and at least one glycol selected from the group consisting of 2-methyl-1,3-propanediol, 2-butyl-2-ethyl-1,3-propanediol and their mixture, in the presence of a transesterification catalyst to form a polyesterimide resin; and subsequently dissolving said polyesterimide resin in an organic solvent containing a crosslinking catalyst.

2. The method according to claim 1, wherein the mixture also contains p,p'-dihydroxy-diphenyl-dimethyl methane.

3. The method according to claim 1, wherein the glycol selected from the group consisting of 2-methyl-1,3-propanediol, 2-butyl-2-ethyl-1,3-propanediol and their mixture is in the amount of 0.05–0.50 mol per 1 mol of a glycol selected from the group consisting of ethylene glycol, neopentyl glycol and their mixture.

\* \* \* \* \*

UNITED STATES PATENT AND TRADEMARK OFFICE
CERTIFICATE OF CORRECTION

PATENT NO. : 5,907,028
DATED : May 25, 1999
INVENTOR(S) : Elzbieta Wardzinska et al.

It is certified that error appears in the above–identified patent and that said Letters Patent are hereby corrected as shown below:
ON THE TITLE PAGE:

Item [73], add the second assignee:

Polifarb Cieszyn-Wroclaw SA, Wroclaw, Poland

Signed and Sealed this

Twenty-first Day of November, 2000

Attest:

Q. TODD DICKINSON

Attesting Officer

Director of Patents and Trademarks